(12) United States Patent
Pank et al.

(10) Patent No.: US 7,708,149 B2
(45) Date of Patent: May 4, 2010

(54) SYSTEM FOR FEEDING A LIQUID FLUID THROUGH A FILTER

(75) Inventors: Thomas E. Pank, 1302 Rising Ridge Rd., Unit 1, Mt. Airy, MD (US) 21771; Austin T. Meyermann, Winterville, GA (US)

(73) Assignee: Thomas E. Pank, Walkersville, MD (US)

( * ) Notice: Subject to any disclaimer, the term of this patent is extended or adjusted under 35 U.S.C. 154(b) by 42 days.

(21) Appl. No.: 11/522,150

(22) Filed: Sep. 16, 2006

(65) Prior Publication Data

US 2007/0023352 A1    Feb. 1, 2007

Related U.S. Application Data

(63) Continuation-in-part of application No. 11/030,939, filed on Jan. 7, 2005.

(60) Provisional application No. 60/718,717, filed on Sep. 20, 2005.

(51) Int. Cl.
  *B01D 29/00* (2006.01)
  *C02F 1/00* (2006.01)
(52) U.S. Cl. .................. 210/497.1; 210/483; 210/494.1; 210/170.03
(58) Field of Classification Search ............... 210/497.1, 210/170.03, 487
See application file for complete search history.

(56) References Cited

U.S. PATENT DOCUMENTS

| | | |
|---|---|---|
| 206,938 A | 8/1878 | Emory |
| 426,489 A | 4/1890 | Connolly |
| 620,316 A | 2/1899 | Haselden |
| 945,989 A | 1/1910 | Sponenbarger |
| 2,076,935 A | 4/1937 | Burckhalter |
| 2,322,548 A | 6/1943 | Sigmund |
| 2,883,058 A * | 4/1959 | Jaume ......................... 210/487 |
| 2,895,615 A | 7/1959 | Oathout |
| 3,025,963 A | 3/1962 | Bauer |
| 3,722,696 A | 3/1973 | Dwyer |
| 4,844,819 A | 7/1989 | Norman |
| 5,114,582 A | 5/1992 | Sandstrom |
| 5,174,895 A | 12/1992 | Drori |

(Continued)

FOREIGN PATENT DOCUMENTS

JP    59 016515 A    1/1984

*Primary Examiner*—Walter D Griffin
*Assistant Examiner*—Denise R Anderson
(74) *Attorney, Agent, or Firm*—William D. Hall; Joe J. Zito (57) ABSTRACT

A large vault or tank receives the runoff water to be cleaned. There are one or more small tanks in the large tank (vault). Each small tank is inverted and receives water at its open lower end, from the large tank. The water entering the small tank rises, as the water level in the large tank rises, and flows upward through a filter. When the water level rises above the top of the filter it enters an outlet tube or pipe and then flows downwardly along the center-line of the filter. A float, a valve and a check valve may cause the system to function as a siphon and feed the filtered clean water to an outlet. Alternatively the siphoning effect will occur if the inside diameter of said outlet tube is small enough to form a partial vacuum.

10 Claims, 9 Drawing Sheets

U.S. PATENT DOCUMENTS

| | | | |
|---|---|---|---|
| 5,707,527 A * | 1/1998 | Knutson et al. | 210/660 |
| 5,730,878 A | 3/1998 | Rice | |
| 5,885,453 A | 3/1999 | Chatelin et al. | |
| 6,027,639 A | 2/2000 | Lenhart, Jr. et al. | |
| 6,649,048 B2 * | 11/2003 | de Ridder et al. | 210/106 |
| 6,869,528 B2 | 3/2005 | Pank | |
| 2002/0096247 A1 | 7/2002 | Wydeven | |
| 2003/0089652 A1 | 5/2003 | Matsui et al. | |

* cited by examiner

SYSTEM FOR FEEDING A LIQUID FLUID THROUGH A FILTER

RELATED CASE

We claim the benefit of our prior U.S. Provisional application Ser. No. 60/718,717, filed Sep. 20, 2005. The present application is a continuation-in-part of prior copending application Ser. No. 11/030,939 filed Jan. 7, 2005 of co-inventor Thomas E. Pank. We also claim the benefit of co-inventor Pank's provisional 60/543,942 filed Feb. 12, 2004.

BACKGROUND OF THE INVENTION

This invention was developed by BaySaver Technologies Inc. (BaySaver) a manufacturer of stormwater pollution controls based in Maryland. BaySaver is licensed under U.S. patents on several different physical separators, including patents U.S. Pat. Nos. 5,746,911 and 6,264,835, both titled "Apparatus for separating a heavy fluid from a light fluid." While physical separators accomplish a great deal and are an important factor in environmental protection, they do not remove dissolved contaminants, nor do they remove sediment particles in the fine silt and clay size range.

Filtration is a proven method of removing dissolved and very fine impurities from a fluid. The most commonly used filter in the stormwater industry is a depth filter. A depth filter uses a media (sand, for example) that the fluid must pass through. The removal is achieved by a combination of two mechanisms: transport and attachment. In a sand filter, the individual grains obstruct the flow of water, forcing the fluid to take a more tortuous path through the filter. When this happens, the fluid comes into contact with far more of the media than it would if it were to flow straight through the filter. The fluid, along with the impurities to be removed, is in contact with the individual grains of sand or other filter media. Bringing the contaminants into contact with the filter media is the first stage—the contaminants are transported into contact with the filter media.

In order to remove the pollutants from the fluid, the media must have some way of capturing and retaining the contaminant. This can be accomplished in a number of ways, from chemical bonding on reactive media to simple sedimentation in the interstices between the media components. When designed carefully, media filtration is capable of removing large pollutant loads from influent fluid streams. The present invention can be used to remove fine sediments, and other entrained pollutants such as oils and grease, and dissolved contaminants from runoff streams. It can also be used to reduce turbidity in the same applications.

The selection of filter media can depend on many factors, including the type of contaminants targeted for removal, the desired flow rates through the filter, the cost and weight of the media, and other factors. While filtration is a proven technology in fields like wastewater treatment, drinking water treatment and industrial processes, it is relatively new in the field of stormwater treatment.

One of the challenges of stormwater management is dealing with the highly variable runoff flow rates, that result from storms. In stormwater applications, treatment devices are subjected to widely varying flow rates, from very slow trickles to the runoff resulting from torrential downpours. To accommodate these variations, many stormwater treatment devices are designed with an internal or external bypass. The bypass allows flows in excess of the intended treatment capacity to pass through the unit untreated, while continuing to treat flows within the intended range. This is a viable technology because of the "first flush" effect in stormwater runoff. During the beginning of a storm event, a "flush" of contaminants is carried off of a site with the first bit of runoff. This flush includes the pollutants that have collected on that site since the last storm, and comprises the majority of the pollution load from each storm event. If the first flush is treated adequately, a majority of the potential contaminants will be removed during that treatment and the subsequent bypass flows during extreme storms will not contain the same heavy pollutant loads.

SUMMARY OF THE INVENTION

This invention relates broadly to a system for filtering a fluid, however one specific application of the invention is to remove small particles, including dissolved contaminants, from runoff water. In treating runoff water it is desirable, but not necessary, to first remove the large particles of contaminants by gravity separation (see U.S. Pat. Nos. 5,746,911 and/or 6,264,835 by Thomas E. Pank). Thereafter, the runoff water is fed to the present invention (FIGS. 1 to 12 incl.) for removal of small particles and/or dissolved contaminants.

The present invention employs a large vault or tank for receiving the runoff water. There are one or more small tanks in the large tank (vault). Each small tank is inverted and receives water, from the large tank, at its open lower end. The water entering the small tank rises, as the water level in the large tank rises, and flows upward through a filter. When the water level rises above the top of the filter it enters an outlet tube or pipe and then flows downwardly along the center-line of the filter. A float, a valve and a check valve may cause the system to function as a siphon and feed the filtered clean water to an outlet. Alternatively the siphoning effect will occur if the inside diameter of said outlet tube is small enough to form a partial vacuum.

While my overall device is primarily for use in cleaning runoff water, various features of the invention have widespread application in the field of filtering; hence many of the claims are not limited to cleaning runoff water.

DETAILED DESCRIPTION OF THE INVENTION

The invention is a modular filter system for stormwater runoff treatment. The filter itself comprises several layers of drainage material and filter material as described in the copending application of Thomas E. Pank, which has been published, see Publication No. U.S. 2005-0178719A-2 dated Aug. 18, 2005.

The complete invention comprises a filter cartridge 21 that is placed in a housing, or large tank, 19. Contaminated fluid enters the housing input tank 19 through an inlet means 17 and accumulates within said housing 19. The fluid may be contaminated with solid particles, undesirable gases, dissolved chemicals, or other pollutants. Within the housing 19, the contaminated fluid enters the filter cartridge 21 and is directed through the filter media 11 contained in said cartridge 21 to remove contaminants from said fluid. Said fluid displaces air within said cartridge 21 through a check valve 14, establishing a siphon effect. The siphon continues to pull fluid from said housing through said filter cartridge until the siphon is broken and air is reintroduced into the filter cartridge.

Figure 1:
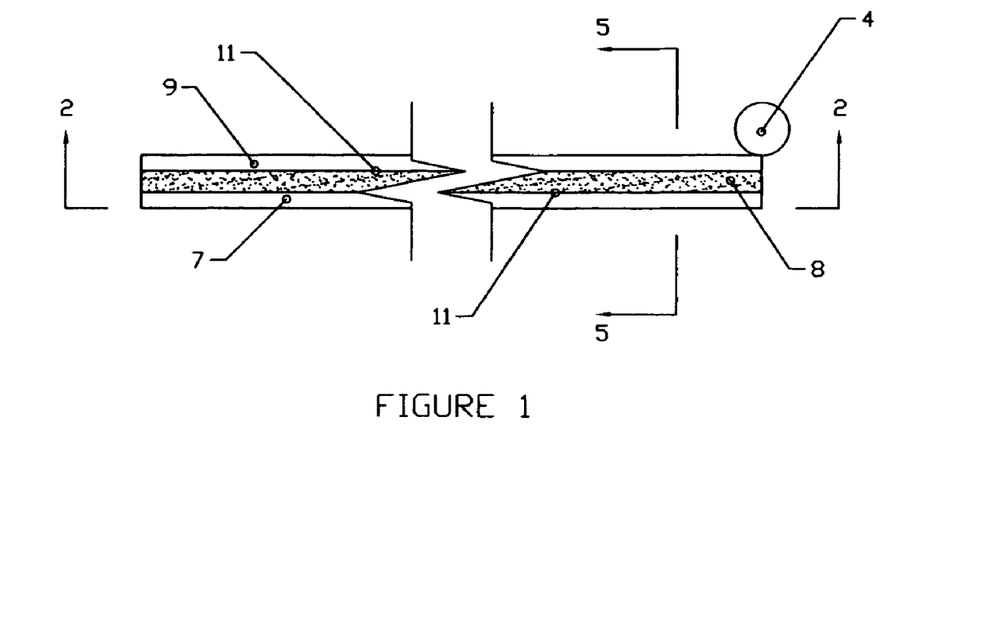
FIG. 1 is a plan view of the unrolled layered filter.

The method of constructing the invention is also a part of this application. The filter cartridge is constructed by rolling a layered filter around a center drain pipe. FIG. 1 shows a plan view of the unrolled filter layer. The filter layer consists of an inlet layer 7 open at its bottom, which is in communication with filter media layer 8. If necessary, inlet layer 7 may be separated from the filter media 8 by permeable barrier 11. On the other side of said filter media, outlet means 9 is open at the top to allow fluid to exit the layer by flowing upwards. On one end of the unrolled layer, vertical drain pipe 4 is placed.

There are numerous forms that the layers 7, 8 and 9 may take and we will set forth two of those forms.

In one of said forms: (a) the strips 7 and 9 may be made of polypropylene cloth and have a thickness of 0.3 inches and a width of 30 inches; and (b) the filter strip 8 is made of high grade geotextile fabric, has a thickness of 0.3 inches and a width of 30 inches.

Another form that the layers 7, 8 and 9 may take is described in the next four paragraphs.

Inlet layer 7 and outlet layer 9 may be defined by permeable material that maintains the shape of said layers so that said layers are empty. In one form of the invention, however, said layers comprise two separate plastic materials: two layers of a relatively rigid high density polyethylene (HDPE) drainage material that provides structure to said layers and an ethyl vinyl acetate (EVA) material fills the space between said layers. In the current mode of that invention, said HDPE material is Poly-flex (a registered trademark). Drainage Net, and said interior filter material is Matala™.

Poly-flex Drainage Net is a high-density polyethylene product between 0.25 and 0.50 inches thick, consisting of two sides. Each side has one series of ridges 31 that run parallel to each other and are arranged at a 45 angle. Said ridges allow water to flow along said material, even when said material is placed directly against a solid surface. The material can be rolled into a spiral in only one direction at time due to its design. When rolled, the grid develops limited rigidity perpendicular to the direction of the roll, thereby lending itself to creating a vertical spiral roll with structural integrity. This integrity also provides stability for the loose media rolled in the filter. In the present mode of this invention, inlet layer 7 and outlet layer 9 are each defined by two layers of Poly-flex Drainage Net.

Matala mat is placed between the two layers of Poly-flex Drainage Net that define inlet layer 7 and outlet layer 9. Matala is a proprietary material developed using the plastic EVA, which is extruded from nozzles to form spaghetti-like strands that adhere to one another. Said strands create a matrix with large amounts of open void space, through which water can flow freely. Because of the properties of EVA, Matala mats are both flexible and compressible, allowing them to be wrapped in a spiral between layers of Poly-flex Drainage Net. The mats used in the present invention vary in thickness between ¾ of an inch and 1½ inches.

Figure 11:
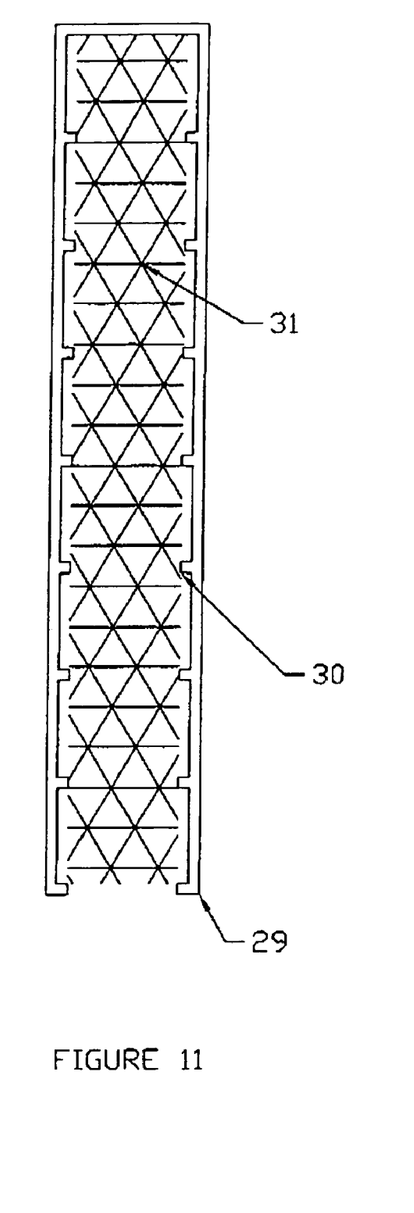
FIGS. 11 and 12 show cross sections of inlet layer 7 and outlet layer 9, respectively.
Figure 12:
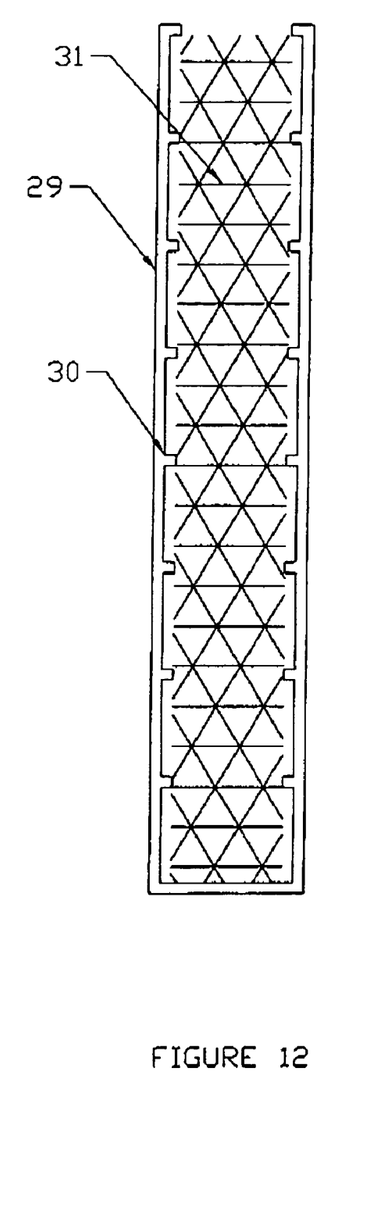

FIGS. 11 and 12 show cross sections of inlet layer 7 and outlet layer 9, respectively. In FIG. 11, inlet layer 7 is open at its bottom to allow water to flow upwards into said layer. The sides of inlet layer 7 are defined by Poly-flex Drainage Net 29, which features drainage ridges 30. Matala mat 31 is placed within the open space defined by drainage net 29. In FIG. 12, outlet layer 9 is open at its top to allow water to flow upwards out of said layer. The sides of outlet layer 9 are again defined by Poly-flex Drainage Net 29, which features drainage ridges 30. Matala mat 31 is again placed within the open spaces defined by drainage net 29.

Figure 2:
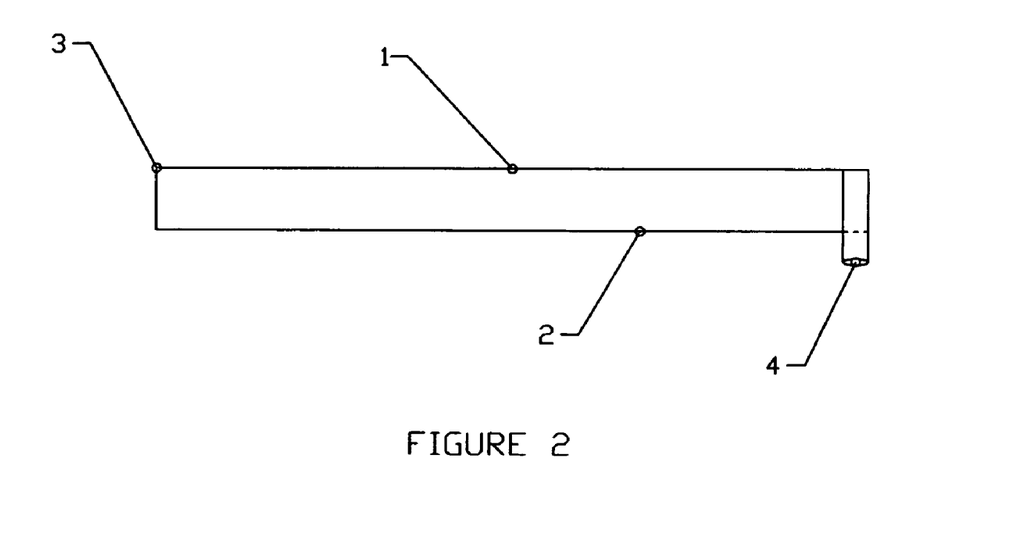
FIG. 2 is an elevation view of the unrolled layered filter, taken along line 2-2 as indicated in FIG. 1.
Figure 3:
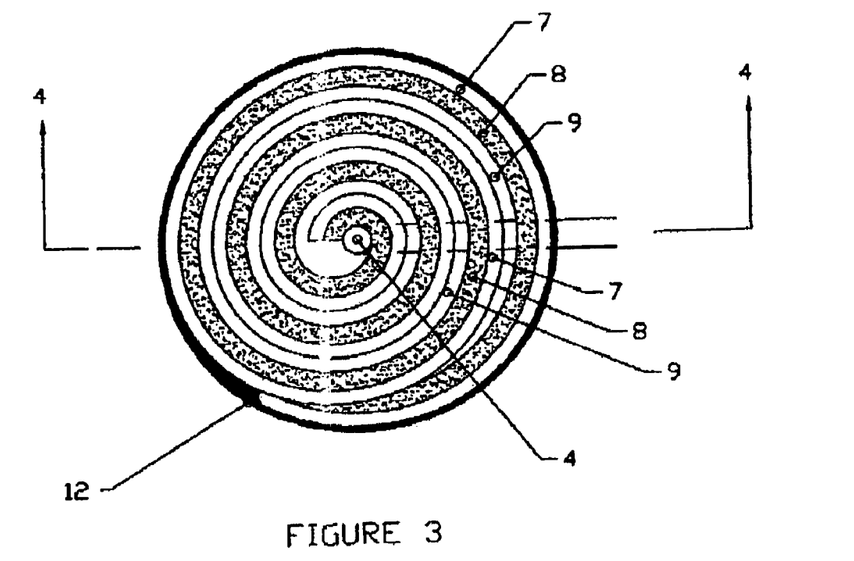
FIG. 3 is a plan view of the rolled filter cartridge.

FIG. 2 shows an elevation view of the unrolled layered filter, with the top 1 and bottom 2 indicated. The layered filter is significantly longer than it is wide, and is flexible enough to be rolled around itself. The filter is constructed by taking a free end 3 of the unrolled filter and tightly wrapping that end around the drain 4 indicated in FIGS. 1 and 2. The unrolled filter must be long enough for the free end 3 to make at least one complete lap around the center drain 4, and preferably is many times longer to provide additional filtration capacity. The resulting cartridge is then oriented so that the top 1 and bottom 2 are in the correct positions. A plan view of the partially constructed filter cartridge is shown in FIG. 3.

Figure 4:
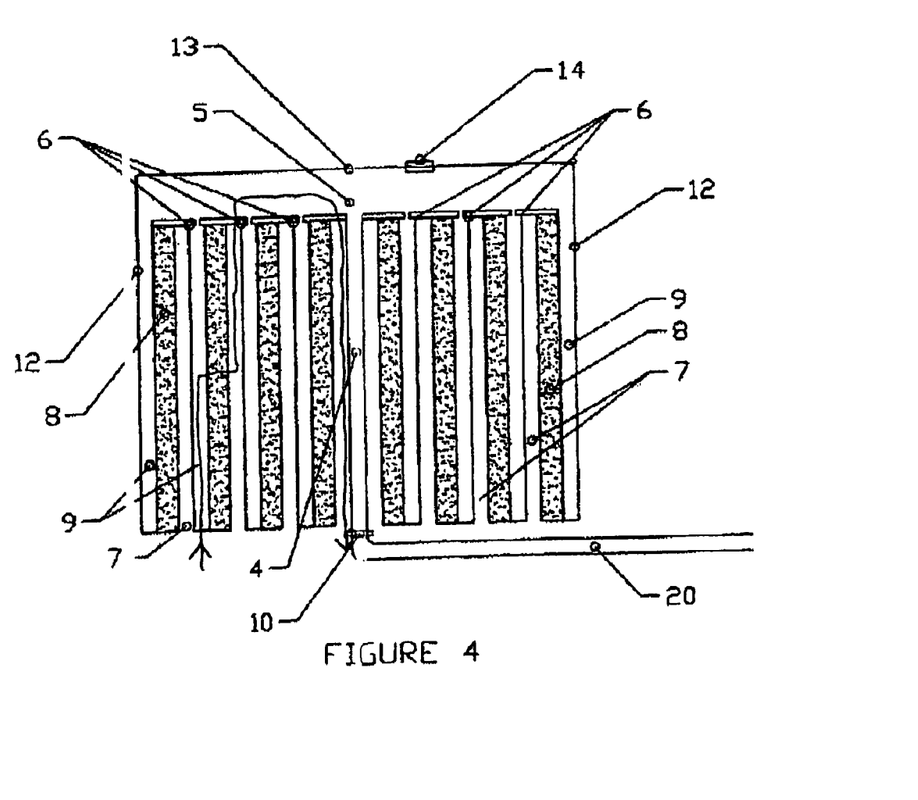
FIG. 4 is a cross section of the assembled filter taken along line 4-4 in FIG. 3.

Outer walls 12 are affixed to the rolled filter cartridge to contain the rolled layers in place. In conjunction with ceiling 13, the outer walls 12 form a space 5 at the top of the interior of said filter cartridge, as shown in FIG. 4. FIG. 4 shows a cross section of the completed filter cartridge, taken along line 4-4 as indicated in FIG. 3. A check valve 14 is located in ceiling 13. Check valve 14 allows air to escape from space 5 when said air is displaced by the fluid to be filtered, and prevents air from reentering space 5 through said valve. The seams 6 between the rolled layers are sealed to prevent the fluid from flowing between the layers instead of through the filter media. Vertical drain pipe 4 flows downward from open space 5. Flow control 10 restricts the flow rate through vertical drain pipe 4 using an orifice, a valve, or other flow control means. Below flow control means 10, the horizontal outlet pipe 20 directs effluent flow away from the filter cartridge.

Figure 5:
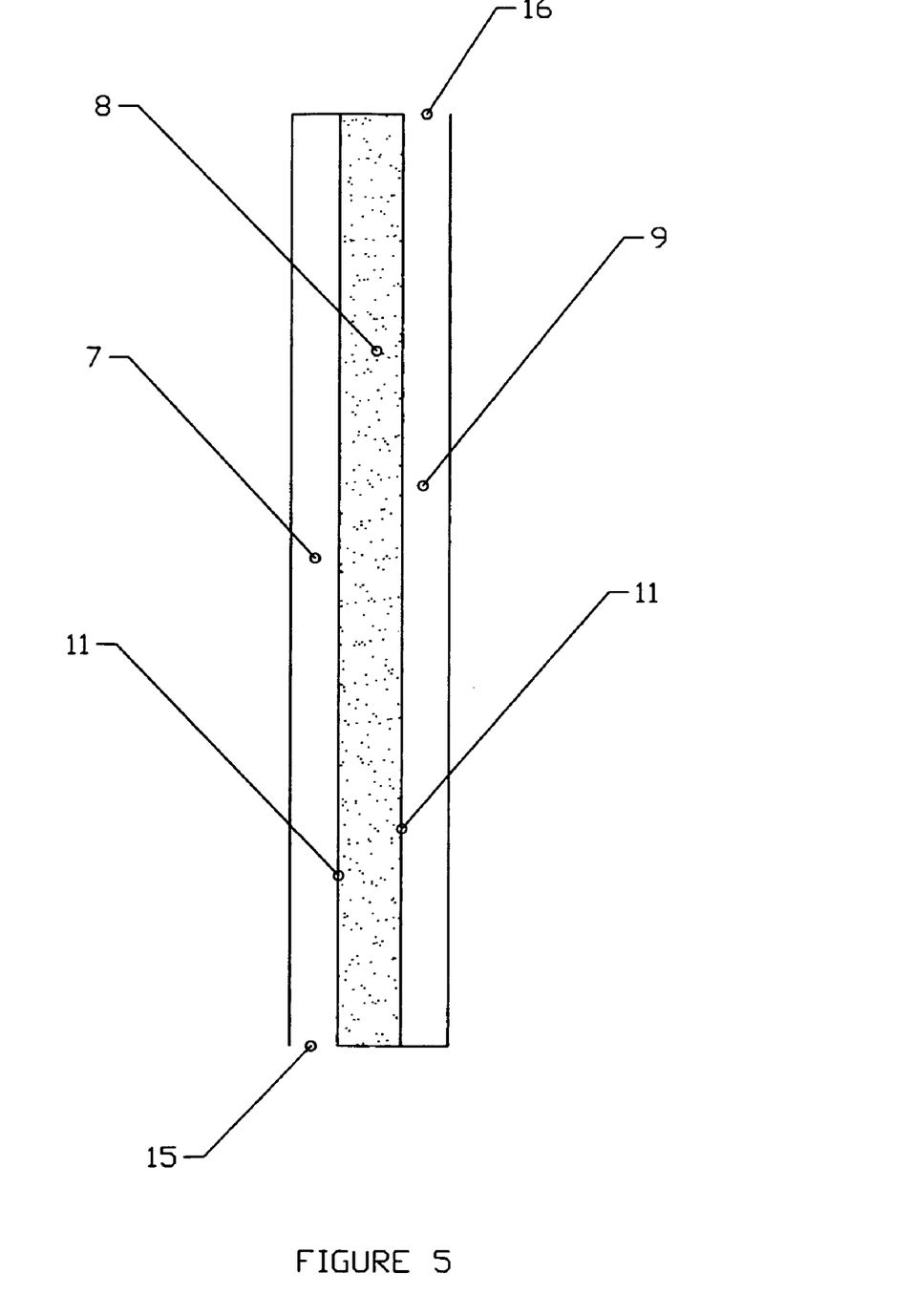
FIG. 5 is a cross section of a single "lap" of the layered filter.

During operation, each "lap" around the centerline functions in the same way. FIG. 5 is a cross section of a single "lap," along line 5-5 as shown in FIG. 1. The cross section is thin relative to its length and width so that it can be rolled. It is shown in FIG. 5 vertically oriented, in the same orientation it has in the complete invention. Each "lap" consists of three layers: an inlet layer 7, the filter media 8, and an outlet layer 9. The inlet layer is open at its bottom and closed at its top, and allows water to enter the filter through opening 15. The center layer contains the filter media 8, and may be held in place by a permeable barrier 11 if required, through which the water can flow at a faster rate than it can flow through the filter media. The filter media 8 may be sand or another filter media selected specifically for the types of contaminants anticipated in the influent fluid. When the filter media is of indeterminate shape and needs to be contained, permeable barrier 11 holds it in place; with some choices of media (cloth, for example), permeable barrier 11 is unnecessary. The third layer, the outlet layer 9, is separated from the filter media by permeable barrier 11. Outlet layer 9 is closed at its bottom to prevent entry of contaminated water and has opening 16 at its top to allow the treated fluid to flow out of the filter unit and into open space 5.

Figure 6:
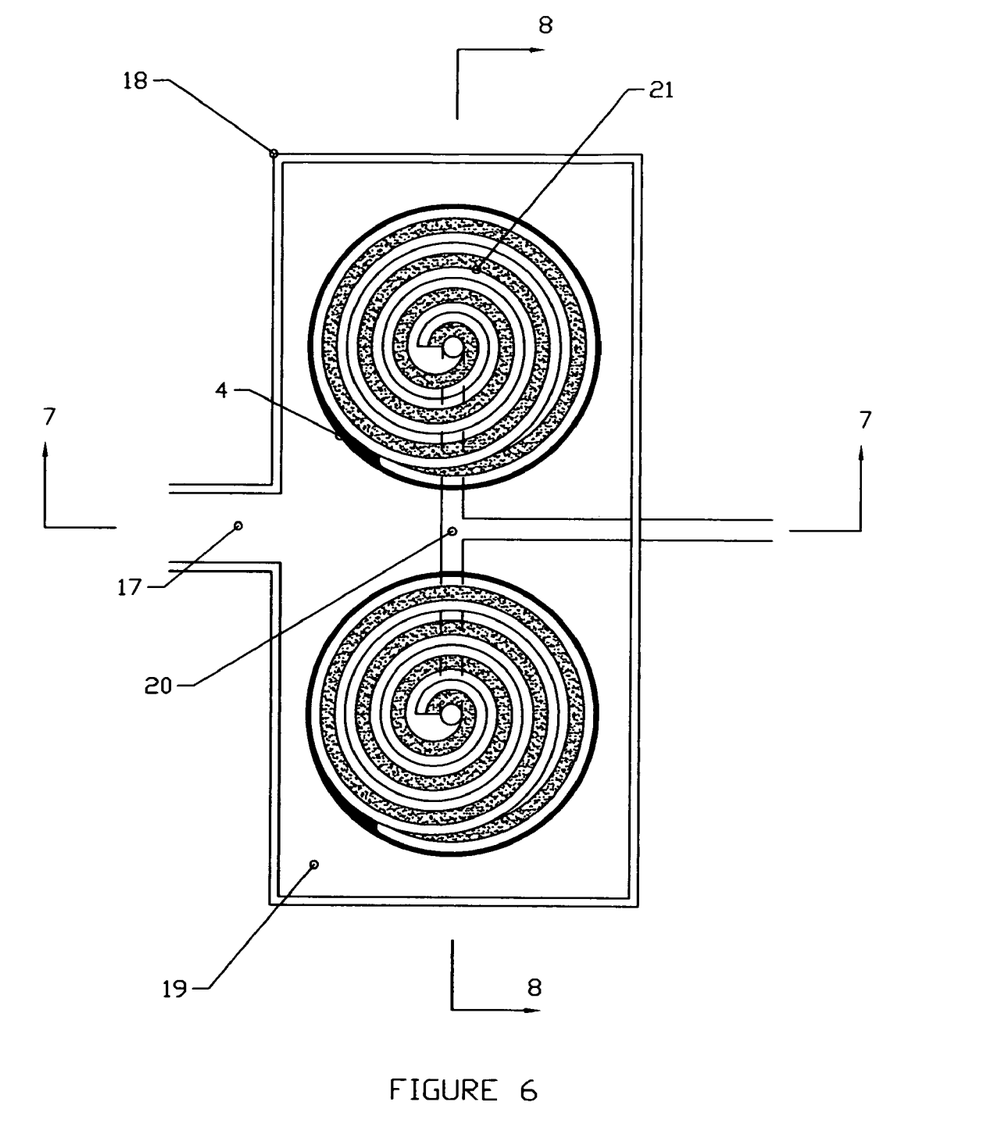
FIG. 6 is a plan view of one form of the invention.

In the complete invention, one or more of the filter cartridges are housed in a single large structure such as large tank 19 as shown in FIG. 6. Inlet means 17 penetrates through the wall 18 of the main structure 19 and discharges the fluid directly into the housing structure. One or more filter cartridges 21 are placed in the housing structure. The discharge pipes 20 from said filter cartridge(s) join together and penetrate the wall of the housing structure. Said discharge pipes 20 direct treated effluent to the invention outfall (not shown).

Figure 7:
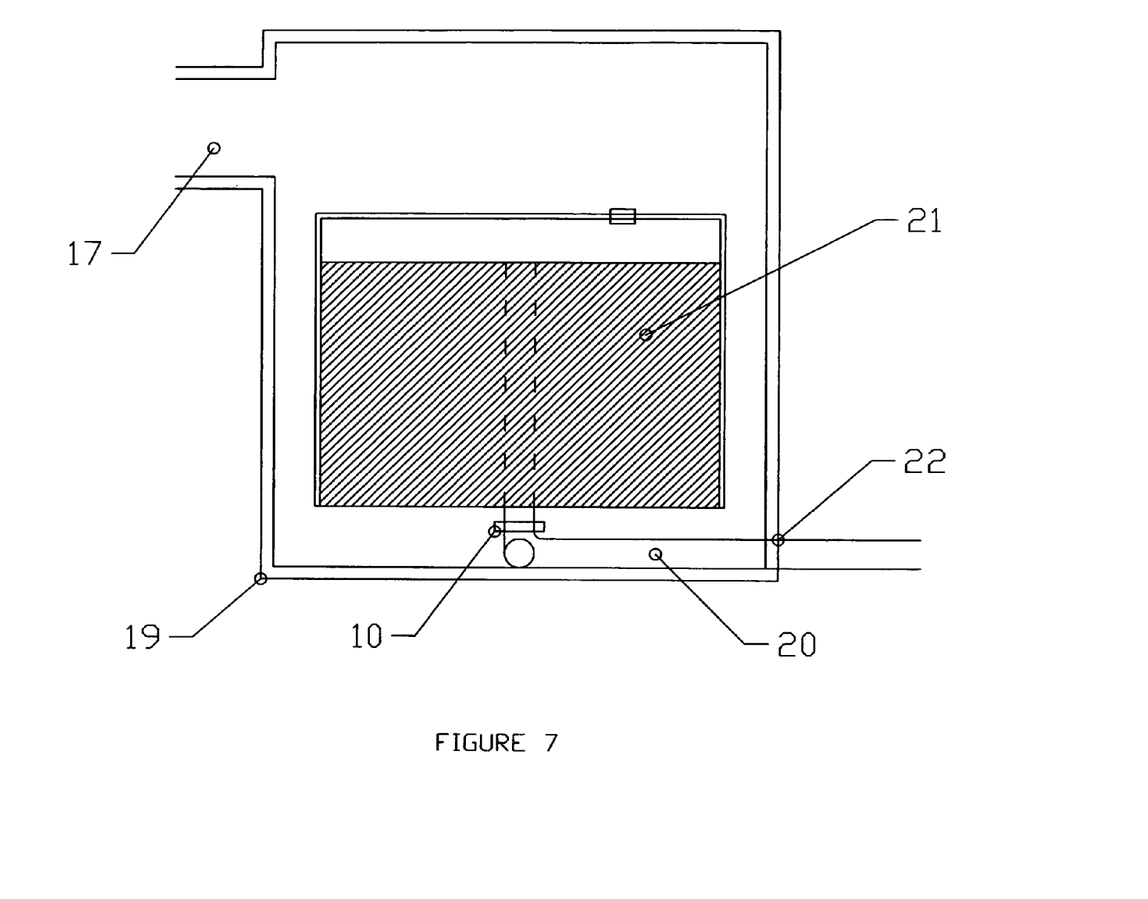
FIG. 7 is a cross section of the form of the invention shown in FIGS. 1-6, taken along line 7-7 in FIG. 6.
Figure 8:
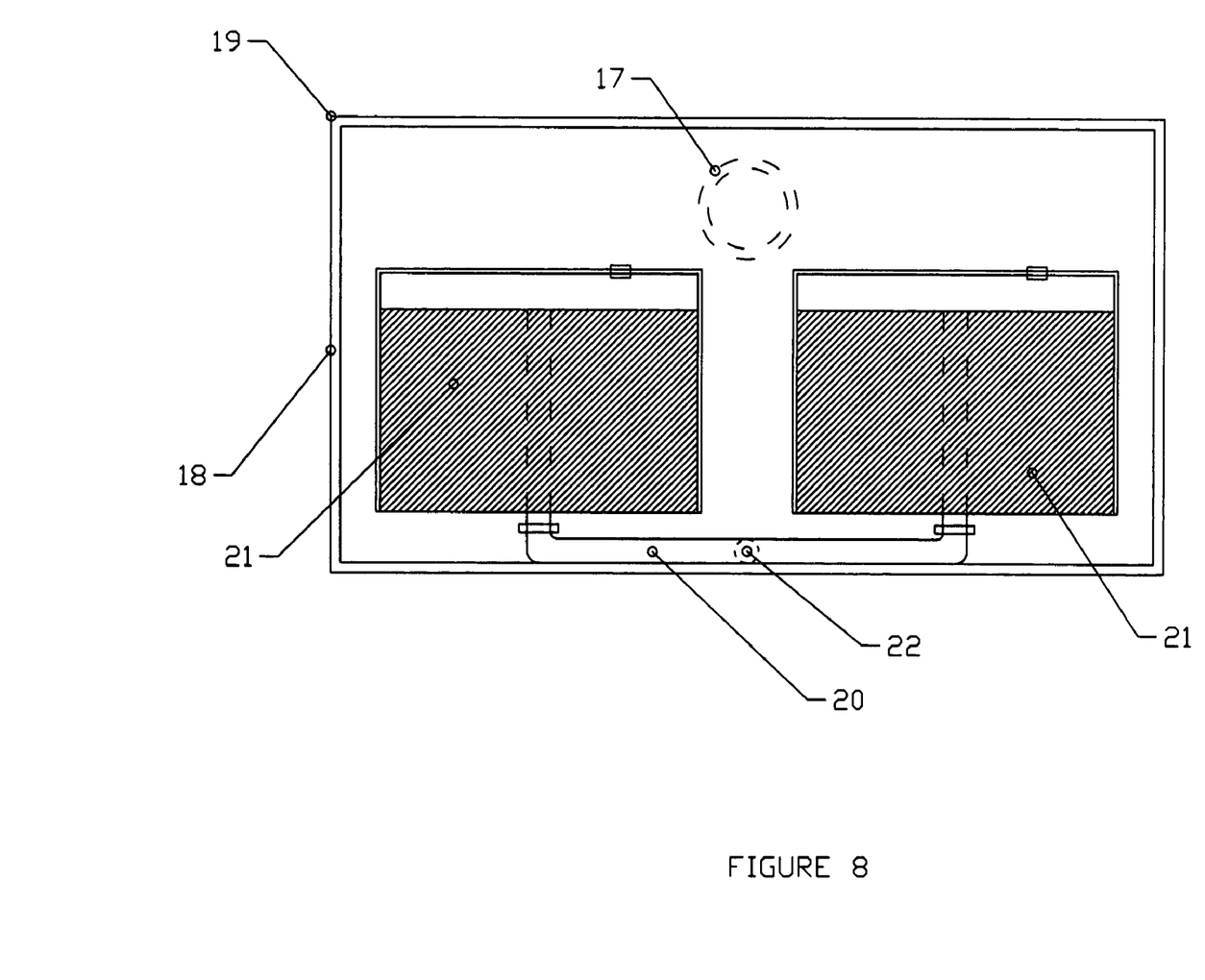
FIG. 8 is a cross section of the form of the invention shown in FIGS. 1-6, taken along line 8-8 in FIG. 6.

FIG. 7 shows a cross section of the complete invention along line 7-7 as shown in FIG. 6. Said filter cartridge discharges treated fluid through flow restriction 10 and into discharge conveyance 20. Discharge conveyance 20 penetrates the wall of the housing structure 19 at joint 22. Because joint 22 is under pressure during normal operation, joint 22 must be sealed.

Figure 9:
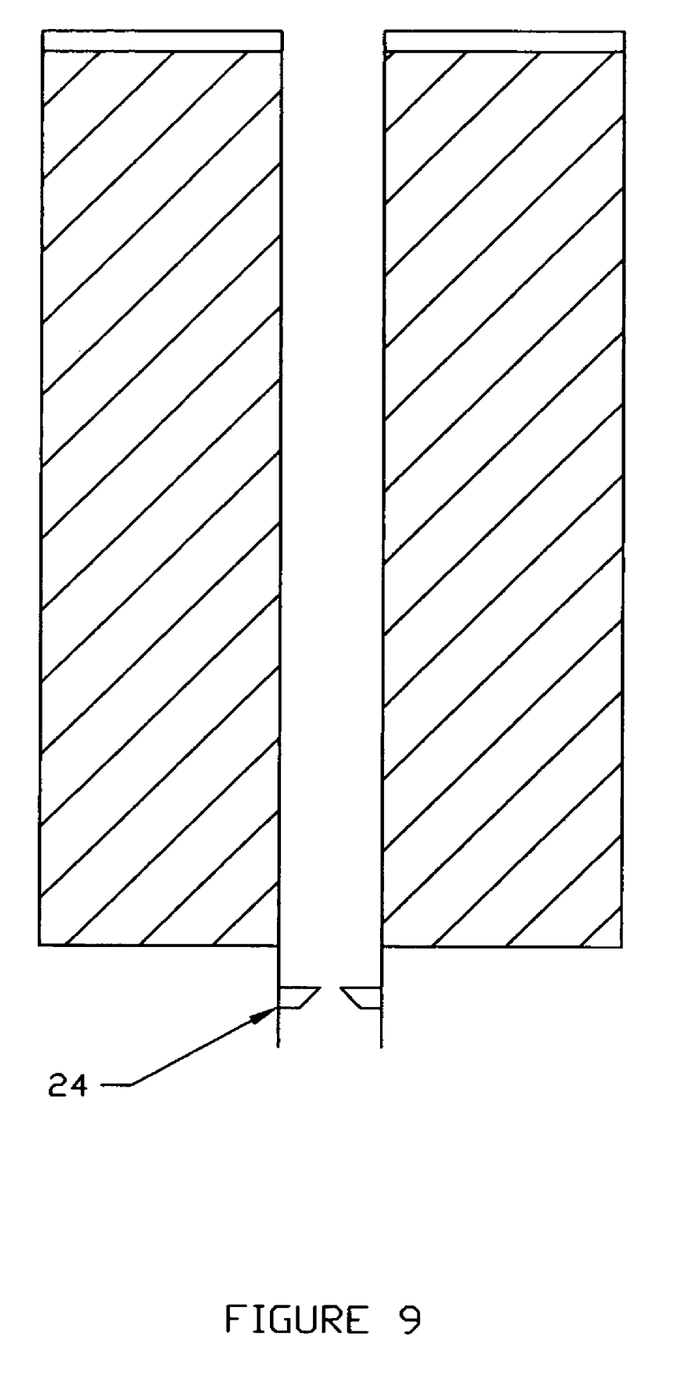
FIG. 9 is one form of the output system of the invention.

FIG. 9 shows a cross section of the filter device, including the flow restriction 24 in the vertical effluent drain pipe. Flow restriction 24 controls the rate of fluid flow out of the cartridge in order to maintain a siphon during normal operation.

Figure 10:
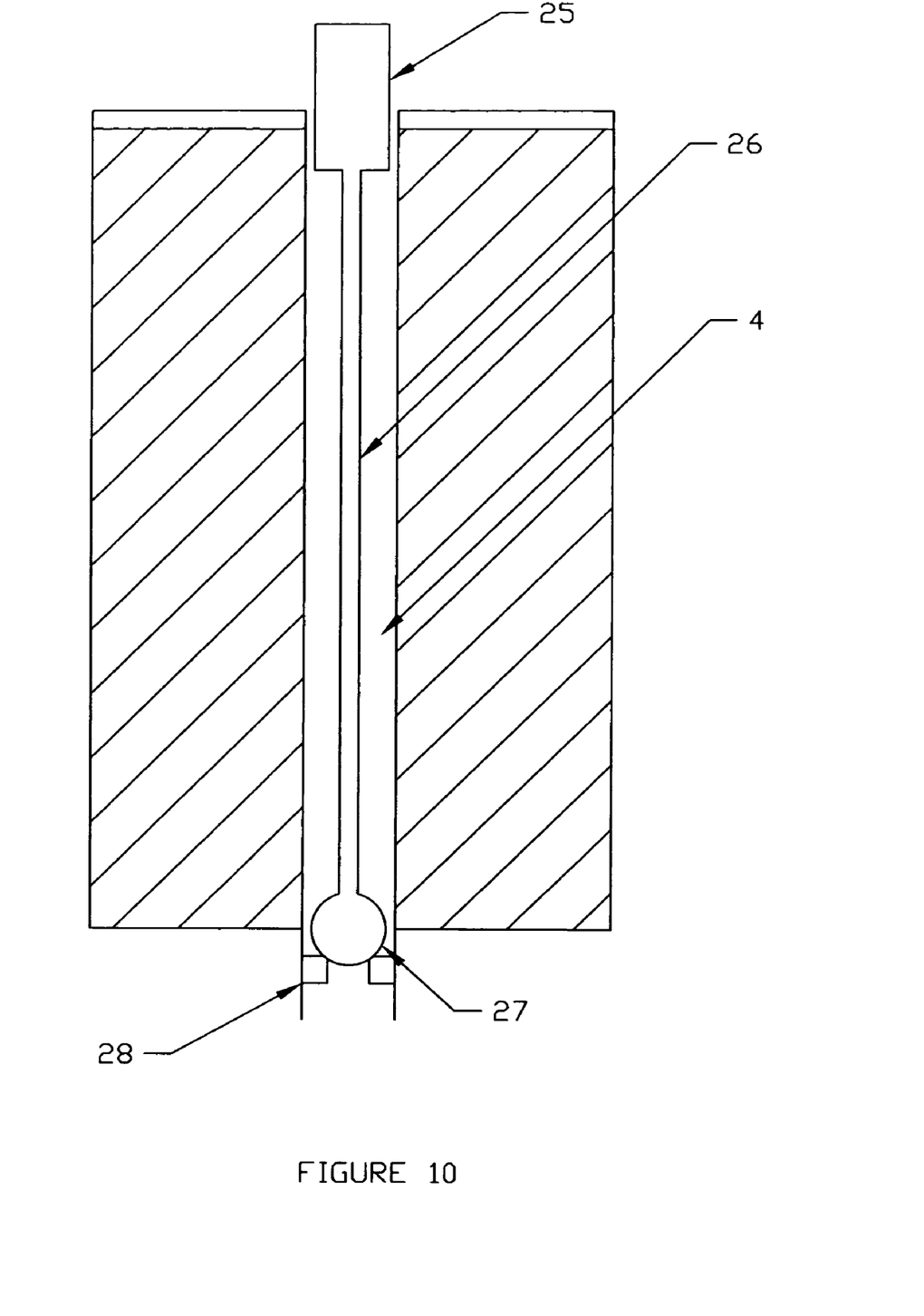
FIG. 10 shows a cross section of the filter cartridge with a float valve to control the effluent flow.

FIG. 10 shows an alternative flow control that may be used in place of flow restriction 24. FIG. 10 shows a float valve assembly that comprises float 25, which is connected to ball 27 by rod 26. Ball 27 is seated in valve seat 28 such that, when seated, said ball does not allow flow to pass through said float valve assembly.

OPERATION OF THE INVENTION

Contaminated fluid enters the invention through inlet means 17. The fluid flows from inlet means 17 and into housing structure 19. Housing structure 19 is in communication with the cartridge inlet layer 7 in each lap of the rolled filter cartridge. The contaminated fluid flows upwards from the housing structure 19 into cartridge inlet layer 7 through openings 15. In the cartridge inlet layer 7, the fluid makes a 90 degree turn and flows through permeable barrier 11 (if present) and into the filter media 8. The fluid flows through the filter media 8, where the contaminants are removed by the media, passes through permeable barrier 11 (if present), and into the fluid outlet layer 9. In the fluid outlet layer 9, the fluid once again makes a 90 degree turn and flows upward through openings 16 into space 5. From space 5, the treated fluid flows downward through drain 4 towards flow restriction 10.

When the contaminated fluid flow rate into the filter cartridge exceeds the discharge flow rate allowed by flow restriction 10, said fluid displaces the air within space 5. Said air is evacuated from space 5 through check valve 14. Once vertical drain 4 is filled with fluid, a siphon is established. This siphon continues to pull contaminated fluid into the filter cartridge as long as the fluid level within housing structure 19 is high enough to prevent air from entering the filter cartridge. When the siphon stops, the water in the filter cartridge is pulled downwardly, due to gravity, and back washes the cartridge.

Treated effluent fluid flows through restriction 10 and into horizontal conveyance 20. Horizontal conveyance 20 carries treated fluid through housing wall 18 and to the outfall of the invention.

Flow restriction 10, shown in greater detail in FIG. 9, can be replaced by the float valve assembly shown in FIG. 10. Said float valve assembly comprises float 25, which is connected to ball 27 by rod 26. When fluid first enters vertical drain pipe 4, ball 27 is seated in valve seat 28, preventing fluid from flowing downward out of the filter cartridge. As the fluid level within said drain pipe rises float 25 is pushed upwards by buoyant forces. When said float rises, it brings with it ball 27, creating an opening between ball 27 and valve seat 28. Fluid flows through said opening and out of the filter cartridge.

We claim:

1. Apparatus for cleaning runoff water, comprising:
a first tank for receiving the runoff water to be cleaned,
a second tank located in said first tank, said second tank being a vertical tube that is open at its lower end to receive runoff water from said first tank, said second tank being closed at its upper end,
a water cleaning device located in said second tank and through which the runoff water to be cleaned must pass as the water level rises in said second tank, and
an output conduit for receiving the runoff water that has passed through said water cleaning device, and discharging said water,
said output conduit is a tube which passes through said water cleaning device,
said water cleaning device comprising a filtering layer of filtering material in the form of a spiral and positioned so that the runoff water to be filtered passes through said filtering layer,
said water cleaning device including a spiral input layer running the length of the spiral filtering layer and which has a lower end that contacts water in said first tank, said spiral input layer feeds that water to said filtering layer, said input layer being sealed in its upper end to thus force the water through said filtering layer of filtering material, and
said second tank defines a space above said water cleaning device for enclosing air and water.

2. Apparatus for cleaning runoff water as defined in claim 1, in which said second tank also has a normally closed check valve which opens when the air pressure downstream of said water cleaning device increases to a given pressure,
said second tank being air tight above the water cleaning device except for said check valve and said output conduit.

3. Apparatus for cleaning runoff water as defined in claim 2, in which said output conduit has means for limiting the flow through said output conduit.

4. Apparatus for cleaning runoff water as defined in claim 1;
said water cleaning device further including an spiral output layer running the length of said spiral filtering layer on a side opposite that of said spiral input layer for transporting said water from said filtering layer to said defined space, and
wherein said output conduit discharges said water below the level of said lower end of said spiral input layer, and which cooperates with said spiral output layer, said defined space and said input layer to form a siphon which draws water up from said first tank when the level of said water in said first tank drops from above said closed upper end of said second tank toward said lower end of said spiral input layer and
wherein said water cleaning device backwashes at least a portion of the (water) cleaning device by passing a portion of said water from said defined space and said output layer backwards through said output layer, said filtering layer and said input layer in series when said siphon breaks as said water level in said first tank falls below said lower end of said input layer.

5. Apparatus for cleaning a liquid fluid, comprising:
a first tank for receiving the fluid to be cleaned,
a second tank located in said first tank,
said second tank being a tube which includes fluid openings throughout its lower end and is closed at its upper end, a fluid cleaning device located in said second tank, said fluid cleaning device being spaced below said upper end thereby forming an upper space, said fluid cleaning device comprising an input layer forming a first passageway and a filtering layer forming a second passageway, said input and filtering layers being contiguous with each other and are in the form of a spiral that encircles a conduit, said conduit having one of its ends open to receive fluid from said upper space and forming a vertical third passageway for said liquid fluid, said open lower end of said second tank being an inlet that receives the liquid fluid to be filtered, and from which the liquid fluid passes through said input and filtering passageways in series.

6. Apparatus for cleaning a fluid as defined in claim 5, wherein said input layer comprises means for receiving liquid fluid from said lower end of said second tank and feeding such fluid to said filtering layer.

7. Apparatus of claim 6 including an output layer forming a vertical passageway between said filtering layer and said upper space.

8. A system for filtering runoff water, comprising:

a first tank for receiving the runoff water to be filtered, a second tank that is inverted having an upper end and a sidewall extending downwardly from said upper end, said second tank being smaller than said first, a fluid cleaning device in said second tank and through which flow of runoff water passes, said fluid cleaning device having a top side spaced below said upper end thereby forming a space which may receive water that passes through said fluid cleaning device, and an outlet conduit for discharging liquid fluid from said space, said outlet conduit comprises a pipe extending from said space through said fluid cleaning device, said fluid cleaning device filtering material is in the form of a spiral wound around said pipe outlet conduit, and means including said outlet conduit (means) for forming a partial vacuum in said outlet conduit to hereby provide a siphon that will pull runoff water from the first tank generally upward through said fluid cleaning device to said outlet conduit so that when the siphon stops, the water in said fluid cleaning device will flow generally downward and back wash said fluid cleaning device.

9. A system for filtering said liquid fluid as defined in claim 8, further including means for limiting the air pressure in said space.

10. A system for filtering a liquid fluid as defined in claim 9, in which said fluid cleaning device includes a filtering material comprising sand.

* * * * *